Jan. 20, 1931.   C. KONCITIK   1,789,631
BRAKE EQUALIZING MECHANISM
Filed Jan. 13, 1930
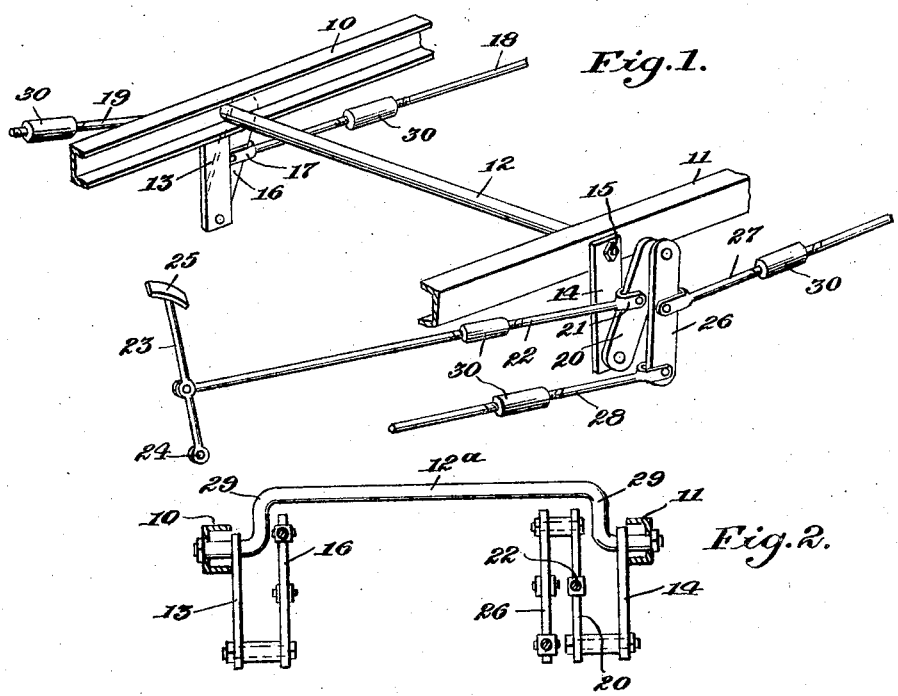
Inventor:
Charles Koncitik,
by Carl Fenning
his Atty.

Patented Jan. 20, 1931

1,789,631

UNITED STATES PATENT OFFICE

CHARLES KONCITIK, OF DETROIT, MICHIGAN, ASSIGNOR OF FORTY PER CENT TO SOL H. KAHN, OF DETROIT, MICHIGAN

BRAKE-EQUALIZING MECHANISM

Application filed January 13, 1930. Serial No. 420,529.

The present invention relates to means for operating brakes of vehicles and is particularly directed toward a structure economical to make and install, and certain and sure of operation in a satisfactory manner. The particular type of brake to which the invention is specifically directed is that means for slowing or stopping the movement of a vehicle generally referred to as four-wheel brakes. In such an arrangement, brakes are applied to each of the four wheels and generally there is a separate braking mechanism for each wheel. In order to produce safe and sure braking, it is essential that the braking force applied to the various wheels shall be uniform in order to effect substantially the same stopping at each portion of the vehicle. To this end various equalizing mechanisms have been adapted and applied to braking systems.

The present invention is directed specifically to an equalizing mechanism which will allow a braking force to be applied at one point on the vehicle and equally distributed at the brakes upon each of the four wheels.

In order to produce the desired effect it is desirable that there be no rigid connection between the mechanism on which the power for operating the brakes is applied and the mechanism which actually applies the brakes. It is desirable that when the main operating mechanism on which the power is applied is moved it shall move the operating mechanism for each of the four brakes, but there should be interposed means for equalizing or relieving the various movements. To this end the present invention contemplates some such device as a rod which may be moved in any appropriate way to cause movement of a device which controls the movement of the brakes themselves. The connection, however, between such rod or other operating device and the main operating device is not rigid but such as to allow a restricted or limited freedom of movement between the two mechanisms. Likewise the devices for operating the specific individual brakes, while operated and controlled by the main operating mechanism, are loosely connected thereto so that they may equalize and adjust themselves.

Preferably the structure is such that in order to take up or adjust the brake-operating mechanism only a single adjustment or change need be made and that adjustment may be made between the main operating mechanism and any one of the brakes or between the main operating mechanism and the point at which the operating energy is applied. The arrangement is preferably such that adjustment at any of these five points while not the same in quantity will be the same in quality and will produce the necessary or desired adjustment throughout the whole structure.

The particular mechanism employed to carry out the invention is immaterial but I have illustrated in the accompanying drawings specific forms the invention may take. Figure 1 is a perspective view of brake-operating mechanism, a portion of the frame of a vehicle also being shown. Fig. 2 is a transverse vertical section of a frame showing another form of brake mechanism embodying the invention.

As far as the present invention is concerned it is immaterial what form of brake is employed and for that reason no brake mechanism has been illustrated. It will be understood, however, that the mechanism embodying the present invention is adapted and intended in operation and use to be associated with suitable braking mechanism there being provided preferably a separate braking mechanism for each of the four wheels of the vehicle.

The braking mechanism of the present invention may be applied to any of a variety of vehicles including automobiles, motor trucks, railway cars, street cars or trams, carriages, wagons, horse-drawn vehicles and the like. Since the invention is of general application it has not been shown in connection with any specific form of mechanism or vehicle although it may be convenient in the description to refer to it as applied to a four-wheel vehicle, two of the frame members of which are marked 10 and 11 in the drawing. Rotatably supported in the frame members is a transverse shaft 12 at one end of which is a downwardly projecting arm 13 and at the other end is a correspondingly projecting arm 14. The arms 13 and 14 may be made integral with the shaft 12 but it is found convenient to have them separate therefrom but secured to the shaft 12 so as to move therewith. The arms 13 and 14 may be held on the shaft by means of nuts 15. Preferably the arms 13 and 14 will extend in the same angular direction from the shaft 12 although this arrangement is not essential to the operation. The arms 13 and 14 have been illustrated as extending downwardly from the shaft 12 but this arrangement is not essential. They might extend upwardly or at any other suitable angle. Toward the end of the arm 13 is pivoted one end of a lever 16 which may be engaged at or about its center by the bifurcated end 17 of a connecting rod 18 which extends to one of the brakes which in the instance shown may be a brake upon a rear wheel. By means of a similar connection the brake operating rod 19 controlling the operation of a brake at a forward wheel may be pivoted to the upper end of the floating lever 16. By this arrangement when the shaft 12 is rotated and the arm 13 swung on the shaft as a pivot it will move the floating lever 16 and operate the two brake rods 18 and 19 so as to operate the corresponding brakes equally.

Near the outward end of the arm 14 is pivoted one end of a lever 20 which is engaged at about its middle by any suitable mechanism such as the bifurcated end 21 connected to an operating rod 22 the other end of which may be attached to the prime mover operating lever 23. Any suitable arrangement may be employed for moving the lever 23. In the present instance the lever 23 is illustrated as pivoted at 24 to any suitable portion of the vehicle and provided with a suitable footpiece 25 which desirably may be located in a convenient position for manipulation by the foot of an operator controlling the movement of the vehicle.

At the other free end of the lever 20 is shown pivoted one end of a lever 26 to which is connected at about its middle a rod 27 for operating one of the rear brakes. Connected near the end of the lever 26 is a brake operating rod 28 which may control the brake on one of the forward wheels. The mechanism here disclosed provides for the various operating parts being arranged outside the frame of the vehicle.

The relative points of attachment on the floating levers, 16, 20, and 26, for the rods 18, 19, 22, 27 and 28, and for the arms 13 and 14 may be varied within wide limits for producing various desired results and the specific arrangements here shown are not essential.

In Fig. 2 is shown a similar arrangement in which the various parts and operating mechanism may be arranged between the side frame members of the vehicle. The corresponding parts are numbered similarly to those in Fig. 1 and the assembly and operation is substantially the same. By this arrangement the rod 22 leading to the foot pedal may be brought toward the center of the vehicle so that it may extend directly to a foot pedal arranged in the usual position in an automobile. In order to give room for the swinging of the upper ends of the lever arms 16, 20 and 26 the main supporting cross-bar in Fig. 2 consists of a shaft 12a carrying the arms 13 and 14 and may be bent upwards as at 29.

In each of the rods 18, 19, 22, 27 and 28 may be arranged a suitable adjusting mechanism which is illustrated in the drawings as a turn-buckle 30 for the purpose of shortening or lengthening the various rods. The rods 18 and 19 are mounted on the floating lever 16 so that the movement of the arm 13 while it will cause movement of the rods 18 and 19 will allow the amount of movement of the two rods to be adjusted and equalized in accordance with the demands for uniform operation of the appurtenant brakes. Likewise the rods 27 and 28 being mounted on the floating lever 26 provide for equalization of movement between the corresponding brakes. Since the shaft 12 is not positively operated by the foot lever 23 but is operated through the floating lever 20 which floating lever carries the floating lever 26 it is obvious that provision is made for automatic equalization to produce a substantially uniform brake operation among the four brakes of the vehicle. Because of this inter-relation of the mechanisms for operating the brakes, operation to adjust any one or more of the turn-buckles 30 will effect not only the brake appurtenant to the rod carrying the adjusted turn-buckle or turn-buckles but because of the intermediate equalizing mechanism will appropriately effect all of the brakes. It may be convenient to perform all of the adjusting on the turn-buckle carried by the rod 22 but in some instances a turn-buckle on another, or more than one, of the rods may be more conveniently accessible and it may be employed ordinarily for adjusting the brakes. While turn-buckles are illustrated on all of the five rods it is obvious that they are not necessary and any one or more of the turn-buckles may be omitted.

The turn-buckles and the rods themselves may be replaced by other equivalent well known suitable devices.

In one aspect, the invention contemplates a structure in which, between the main operating cross-shaft and one pair of brakes, is inserted a floating lever while, between the main cross-shaft and the other pair of brakes, is inserted a pair of floating levers one of said pair of floating levers being relied on to actuate the main cross-shaft and being inserted between the main cross-shaft and the floating lever carrying the rods for operating the appurtenant pair of brakes.

The proportions, relative connections and forms of elements illustrated and described form no portion of the present invention and are not essential thereto. It will be understood, therefore, that in its general aspects other suitable apparatus may be employed to embody the invention.

I claim as my invention:

1. Means for operating brakes comprising a shaft, arms rigid with the shaft, a lever pivoted near one end to an arm, means extending in opposite directions from different points on the lever for operating different brakes, an operating lever pivoted near one end to another arm, means at a distance for moving the lever to turn the shaft, a lever pivoted near one end to the free end of the operating lever and means extending in opposite directions from different points on the last named lever for operating different brakes.

2. A shaft, means differentially mounted thereon for operating two sets of brakes, and means for operating the shaft mounted between one brake operating means and the shaft.

3. A shaft, means moving therewith but free to move relative thereto for operating a pair of brakes, means for operating the shaft free to move relative to the shaft, means on the shaft operating means for operating another pair of brakes and moving with the shaft and shaft operating means but free to move relative thereto.

4. A shaft, compensating means near one end for operating a pair of brakes, compensating means near the other end for operating another pair of brakes, and means associated with one of said compensating means for operating the shaft and compensating the operations of the two pairs of brakes.

5. Compensating means for operating a pair of brakes, compensating means for operating another pair of brakes, and compensating means associated with one of said compensating means for operating both pairs of brakes together.

6. A shaft, separate compensating means for operating two pairs of brakes therefrom, and compensating means interposed between the shaft and one of the first mentioned means for operating the shaft.

7. A transversely disposed rotatable shaft, a crank arm carried near each end of the shaft, a floating lever mounted on each crank arm, connections between one floating lever and a front brake and a rear brake, the front brake connection being attached above the rear brake connection, connections between the other floating lever with means for operating the whole mechanism, a third floating lever mounted on said last mentioned floating lever, and connections between the third floating lever and a front brake and a rear brake, the front brake connection being attached below the rear brake connection.

CHAS. KONCITIK.